(12) United States Patent
Chen et al.

(10) Patent No.: US 6,825,969 B2
(45) Date of Patent: Nov. 30, 2004

(54) MEMS-ACTUATED COLOR LIGHT MODULATOR AND METHODS

(75) Inventors: Zhizhang Chen, Corvallis, OR (US); Michael A. Pate, Corvallis, OR (US); Hung Liao, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/800,326

(22) Filed: Mar. 11, 2004

(65) Prior Publication Data

US 2004/0174583 A1 Sep. 9, 2004

Related U.S. Application Data

(62) Division of application No. 10/280,995, filed on Oct. 24, 2002, now Pat. No. 6,747,785.

(51) Int. Cl.[7] .............................................. G02B 26/00
(52) U.S. Cl. ...................................... 359/290; 359/291
(58) Field of Search ................................. 359/237, 290, 359/291, 295, 298, 566, 569, 571; 250/237 G

(56) References Cited

U.S. PATENT DOCUMENTS

| | | | |
|---|---|---|---|
| 3,045,532 A | | 7/1962 | Staunton |
| 3,216,315 A | | 11/1965 | Keller |
| 5,012,090 A | * | 4/1991 | Spillman, Jr. ........... 250/237 G |
| 5,069,419 A | | 12/1991 | Jerman |
| 5,561,558 A | | 10/1996 | Shiono et al. |
| 5,757,536 A | | 5/1998 | Ricco et al. ................ 359/224 |
| 5,905,571 A | | 5/1999 | Butler et al. |
| 6,067,797 A | | 5/2000 | Silverbrook |
| 6,137,206 A | | 10/2000 | Hill |
| 6,211,598 B1 | | 4/2001 | Dhuler et al. |
| 6,255,757 B1 | | 7/2001 | Dhuler et al. |
| 6,275,320 B1 | | 8/2001 | Dhuler et al. |

(List continued on next page.)

FOREIGN PATENT DOCUMENTS

JP 2001-138298 3/2001

OTHER PUBLICATIONS

V. Ramachandran et al., An assessment of the blased grating electro–optic deflector, J. Phys. D: Appl. Phys. vol. 8, 1975 pp. 1923–1926.

K. B. Petersen, Micromechanical light modulator array fabricated on silicon, Appl. Phys. Letters, vol. 31, No. 8, Oct. 15, 1977, pp. 521–523.

M. H. Brodsky et al., Color Projection Deformographic Display using Silicon Micromechanics and Optical Diffraction, IBM Technical Disclosure Bulletin, Jun. 1, 1980, pp. 394–395.

(List continued on next page.)

*Primary Examiner*—Ricky Mack
*Assistant Examiner*—Brandi N Thomas

(57) ABSTRACT

A light modulator has one or more gratings and one or more MEMS actuators operable to move the gratings for selectively modulating light from an input light source. Certain embodiments have a plurality of blazed gratings arranged parallel to a plane and movable linearly parallel to the plane by MEMS actuators. Each of the gratings is individually blazed for light of a selected color such as red, green or blue. Associated with the gratings may be portions providing black and/or white outputs. An aperture spaced apart from the plane allows color(s) selected from an input white-light source to be directed to an output. An array of MEMS-actuated modulation devices provides a color spatial light modulator. Other embodiments have a grating adapted to be tilted by a MEMS actuator, either continuously through a range of angles or to a selected angle of a set of predetermined discrete angles, to direct selected wavelengths diffracted by the grating toward collection optics for a modulated light output. Methods specially adapted for making and using such light modulators are disclosed.

26 Claims, 3 Drawing Sheets

U.S. PATENT DOCUMENTS

| | | | |
|---|---|---|---|
| 6,275,325 B1 | 8/2001 | Sinclair | |
| 6,289,145 B1 | 9/2001 | Solgaard et al. | |
| 6,307,663 B1 | 10/2001 | Kowarz | |
| 6,329,738 B1 * | 12/2001 | Hung et al. | 310/309 |
| 6,360,036 B1 | 3/2002 | Couillard | |
| 6,374,008 B2 | 4/2002 | Solgaard et al. | |
| 6,377,438 B1 | 4/2002 | Deane et al. | |
| 6,386,507 B2 | 5/2002 | Dhuler et al. | 251/111 |
| 6,389,190 B2 * | 5/2002 | Solgaard et al. | 385/18 |
| 6,407,478 B1 | 6/2002 | Wood et al. | 310/307 |
| 6,409,198 B1 | 6/2002 | Weimer et al. | 250/339 |
| 6,410,361 B2 * | 6/2002 | Dhuler et al. | 438/54 |
| 6,428,173 B1 | 8/2002 | Dhuler et al. | 359/872 |
| 2001/0008357 A1 | 7/2001 | Dhuler et al. | 310/306 |
| 2001/0017358 A1 * | 8/2001 | Dhuler et al. | 251/129.01 |
| 2001/0030817 A1 | 10/2001 | Hagelin et al. | 359/871 |
| 2001/0038254 A1 | 11/2001 | Dhuler | 310/307 |
| 2001/0051014 A1 | 12/2001 | Behin et al. | 385/116 |
| 2002/0003661 A1 * | 1/2002 | Nakai | 359/569 |
| 2002/0018334 A1 | 2/2002 | Hill et al. | 361/278 |
| 2002/0021860 A1 | 2/2002 | Ruan et al. | 385/18 |
| 2002/0033048 A1 | 3/2002 | McIntosh et al. | 73/514.32 |
| 2002/0041735 A1 | 4/2002 | Cai et al. | 385/18 |
| 2002/0054422 A1 | 5/2002 | Carr et al. | 313/495 |
| 2002/0061160 A1 | 5/2002 | Solgaard et al. | 385/18 |
| 2002/0070723 A1 | 6/2002 | Herbert et al. | 324/99 |
| 2002/0075554 A1 | 6/2002 | Brophy et al. | 359/221 |
| 2002/0079432 A1 | 6/2002 | Lee et al. | 250/216 |
| 2002/0196548 A1 * | 12/2002 | Fabiny | 359/571 |

OTHER PUBLICATIONS

W. B. Pennbbaker, Projection Display with Electrochemically Created Grating Structures, IBM Technical Disclosure Bulletin, Jun. 1, 1980, pp. 397–400.

H. Haystre et al., Optimization of a wavelength demultiplexer in fiber optics using gold echelette gratings, Proc. SPIE—Application Theory and Fabrication of Periodic Structures.

R. E. Brooks, Micromechanical light modulators on silicon, Optical Engineering, vol., 24, No. 1, Jan./Feb. 1985, pp. 101–106.

J. A. Stein et al., A Display Based on Switchable Zero Order Diffraction Grating Light Valves, Advances in Display Technology V SPIE vol. 626, Jan. 1985, pp. 105–112.

P. Philippe et al., Wavelength demultiplexer: using echelette gratings on silicon substrate, Applied Optics, vol. 24 No. 7, Apr. 1, 1985, pp. 1006–1011.

S. R. Mallinson et al., Miniature micromachined Fabry–Ferot interferometers in silicon, Electronics Letters, vol. 23, No. 20, Sept. 24, 1987, pp. 1041–1043.

J–P. Lauds et al., Wavelength division multiplexing/demultiplexing (WDM) using diffraction gratings, Proc. SPIE—Application, Theory, and Fabrication of Periodic Structures SPIE vol. 503 Aug. 21–23, 1984, pp. 22–28.

P. Hesketh et al., Anomalcus Emissivity from Periodic Micromachined Silicon Surfaces, Technical Digest IEEE Solid–State Sensors Workshop, Jun. 1986 (reprinted in "Micromachanics and MEMS—Classic and Seminal Papers to 1990") Jun. 1986.

W. Ehrfeld et al., Fabrication of Microstructures Using the LIGA Process, Proceedings IEEE Micro Robots and Teleoperators Workshop Nov. 1987 (reprinted in Micromechanics and MEMS.

O. Solgaard et al., Deformable Grating Optical Modulator, Optics Letters, vol. 17, No. 9, May 1, 1992, pp. 688–690.

D. E. Sene et al., Development and characterization of micromechanical gratings for optical modulation, Proc. IEEE MEMS–96, Jun.–96, pp. 222–227.

D. M. Burns et al., Micro–electro–mechanical variable blaze gratings, Proc. IEEE MEMS–97 Workshop, Nagoya Japan, Jan. 24, 1997, pp. 55–60.

R. K. Mali et al., Development of micromechanical deformable mirrors for phase modulation of light, Optical Engineering, vol. 36, No. 7, Feb. 1997 pp. 542–548.

M. L. Scott et al., Gray Scale Deformable Grating Spatial Light–Modulator for High Speed Optical Processing, Smart Structures and Materials 1997, Smart Electronics and MEMS.

D. M. Burns et al., Optical beam steering using surface micromachined gratings and optical phased arrays, Optical Scanning Systems, Design and Applications, SPIE vol. 3131 Jul.

D. Armitage, Diffractive Projection Displays, Projection Displays II, SPIE vol. 3013, May 1, 1997, pp. 112–125.

D. M. Bloom, The Grating Light Valve: revolutionizing display technology, Projection Displays II, SPIE vol. 3013, May 1, 1997, pp. 165–171.

M–H Kiang et al., Surface–micromachined Diffraction Gratings for Scanning Spectroscopic Applications, TRANSDUCERS '97, 9th Int. Conf. on Sensors and Actuators, IEEE and Transducers Research Foundation, Jun. 16–19, 1997, Chicago, IL., Jun. 16–19, 1997.

R. Allan, Reflective Color Flat–Panel Display Developed From A Deformable MEMS Optical Modulator, Electronic Design, Jun. 23, 1997.

D. M. Burns et al., Development of microelectromechanical variable blaze gratings, Sensors and Actuators A:Physical, vol. 64 No. 1, 1998, pp. 7–15.

D. T. Amm et al., Optical Performance of the Grating Light Valve Technology, SPIE Conference on Projection Displays V, SPIE vol. 3634, Jan. 1999, pp. 71–78.

D. C. McCarthy, Photonic Switches: Fast, but Funtional?, Photonics Spectra, Mar. 1, 2001, pp. 140–150.

Anon, All the Good Bits: Displaying and Printing Digital Pictures, http://www.kodakkores.co.kr/UB/en/corp/researchDevelopment/technologyFeatures/gems.shtml, Feb. 2002.

* cited by examiner

MEMS-ACTUATED COLOR LIGHT MODULATOR AND METHODS

This application is a divisional of application Ser. No. 10/280,995 filed Oct. 24, 2002 now U.S. Pat. No. 6,747,785.

TECHNICAL FIELD

This invention relates to color light modulators and more particularly to color modulators actuated by a MEMS actuator.

BACKGROUND

There are many applications for color light modulators that have high resolution and brightness, including applications in display of information for education, business, science, technology, health, sports, and entertainment. Some light modulators, such as oil-film projectors, liquid-crystal displays (LCD's), digital light-mirror arrays, and deformographic displays, have been applied for large-screen projection. In the visible spectrum, light modulators, such as the reflective digital mirror arrays, have been developed with high optical efficiency, high fill-factors with resultant low pixelation, convenient electronic driving requirements, and thermal robustness. For gray scale variation, binary pulse-width modulation has been applied to the tilt of each micro-mirror. To vary color, such modulators typically have used either a sequential color wheel (rotating color filter) or multiple modulators than individual stationary color filter being associated with each modulator. In the latter case, the various color images (e.g., red, green, and blue) are recombined optically. Both binary pulse-width modulation and synchronization of color information has been accomplished by off-chip electronics, controlling on- or off-chip drivers.

Diffractive light modulators and displays have also been developed, in which bright and dark pixels in a display are produced by controlling a diffraction grating at each pixel, effectively varying the grating frequency of each pixel by varying a gap between a thin film ribbon and a substrate surface. Typically, for color displays using this principle, three different gratings and three associated actuators have been required for each pixel.

Both micro-mirror and diffraction-grating types of modulators have used actuators based on micro-electro-mechanical-system (MEMS) techniques. MEMS actuators have also been employed in other applications such as micro-motors, micro-switches, and valves for control of fluid flow.

While the various color light modulators have found widespread success in their applications, there are still unmet needs in the field of color- and spatial-light-modulators, such as combining analog color modulation with high optical efficiency and close integration of color synchronization with each pixel modulator.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Throughout this specification and the appended claims, the term "MEMS" has its conventional meaning of a micro-electro-mechanical system.

For clarity of the description, the drawings are not drawn to a uniform scale. In particular, vertical and horizontal scales may differ from each other and may vary from one drawing to another.

While the invention should not be construed as being limited to the consequences of any particular theory of operation, it is known that a reflective diffraction grating follows the grating equation:

$$m*(\text{lambda}) = d*(\text{Sin(theta)sub}(i) + \text{Sin(theta)sub}(m)), \text{where } m=0, +/-1, +/-2, \ldots$$

where (lambda) represents a wavelength of light, m represents an integer known as the diffraction order, d represents the grating pitch, (theta)sub(i) represents the angle of an incident light beam with respect to a direction normal to the grating, and (theta)sub(m) represents the angle of the $m^{th}$ order diffracted light beam with respect to a direction normal to the grating.

The technique of shaping the diffraction grating grooves so that the diffraction envelope maximum shifts into a particular order is known as blazing the grating. The diffraction envelope maximum occurs when (Beta)=0, where the far-field path difference (Beta) for light rays from the center and the edge of any groove is zero. In a reflective grating, efficiency is enhanced by using a highly reflective material like aluminum on the groove faces.

Figure 1A:
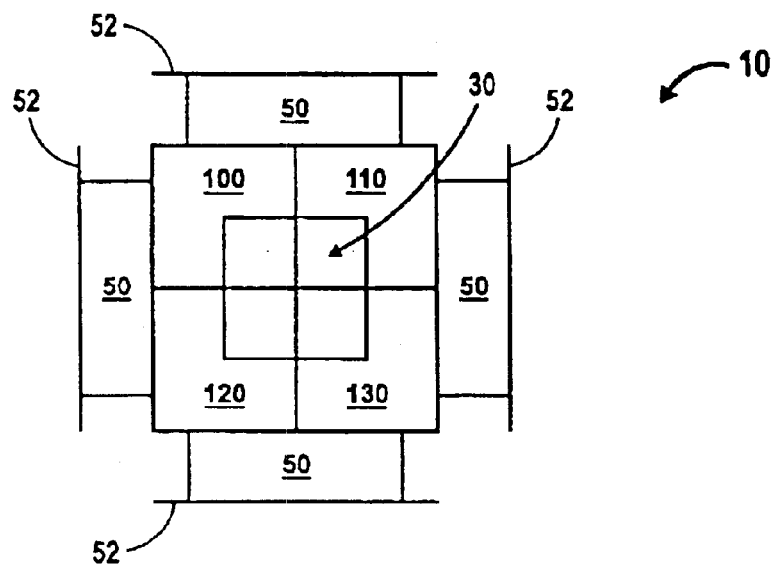
FIG. 1A is a schematic top plan view of a first embodiment of a color modulator made in accordance with the invention.
Figure 1B:
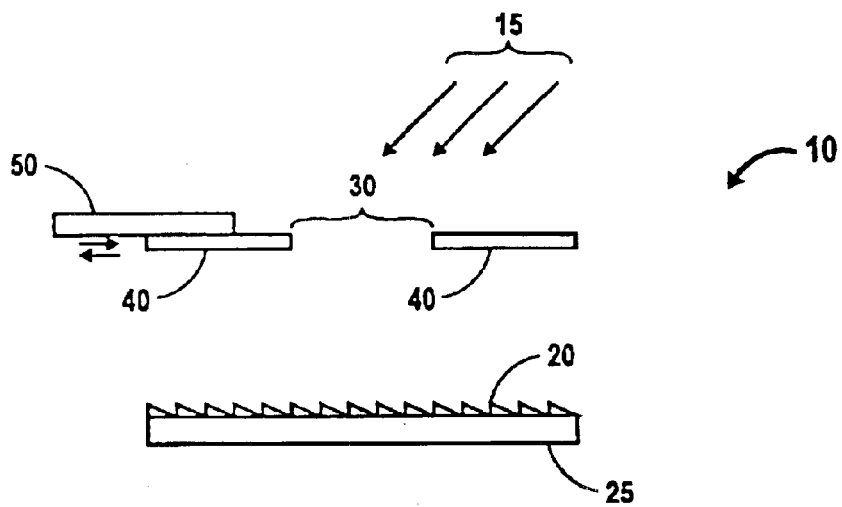
FIG. 1B is a schematic side elevation cross-sectional view of the first embodiment shown in FIG. 1A.

In the following detailed description, we begin by describing an embodiment of a wavelength modulation device for light from a source of white light. The modulation device includes at least one grating (blazed for a predetermined wavelength of light) disposed to receive white light from the source, at least one aperture disposed over the blazed grating between the source and the blazed grating, and microelectromechanical means for moving the grating relative to the source and the aperture to selectively return light of the predetermined wavelength through the aperture when actuated by an electrical signal. FIG. 1A is a schematic top plan view of this first embodiment of a color modulator (denoted generally by reference numeral 10), and FIG. 1B is a schematic side elevation cross-sectional view. The device is made by processes compatible with otherwise conventional MEMS and complementary metal-oxide-silicon (CMOS) processing.

As shown in FIGS. 1A and 1B, modulator 10 includes a blazed grating 20 formed on a substrate 25. White light 15 from a source (not shown) is incident on modulator 10. Blazed grating 20 has at least three portions 100, 110, and 120, each portion blazed for a different wavelength or color, e.g. red, green, or blue, and optionally a fourth portion 130 that is adapted to reflect white light or substantially no light (effectively a black area). Blazing the grating portions 100, 110, and 120 respectively for red, green, and blue provides an RGB display, for example. The black option for fourth portion 130 is shown in FIG. 1A. Portion 130 may be made black by forming a region of substantially unit emissivity. Alternatively, portion 130 may be made to appear substantially white by forming a highly reflective area for reflecting the incident white light. A plate 40 above grating 20 has an aperture 30 which admits white light 15.

Grating portions 100, 110, and 120 of grating 20 are formed on substrate 25. Those skilled in the art will recognize that blazed gratings of the desired form can be micromachined by suitable anisotropic etching of a single-crystal silicon surface that has been prepared with selected crystallographic orientation. For some wavelength ranges, suitable conventional resists and photolithography may be used to define the grating groove patterns. Another known method for defining the grating groove pattern is laser holography. Alternatively, grating portions may be formed by using a grating mask to pattern a photosensitive polymer material to a desired period (groove pitch) and angle. The grating mask may be prepared by conventional electron-beam lithography, ion-beam lithography, or X-ray lithography, for example. A single mask can include the patterns for more than one grating. The various grating patterns of such a mask can produce gratings having the same or different groove pitch and blaze angle. Then, a thin film of aluminum or other highly reflective material is coated on the grating surfaces to enhance the reflective efficiency.

Figure 2:
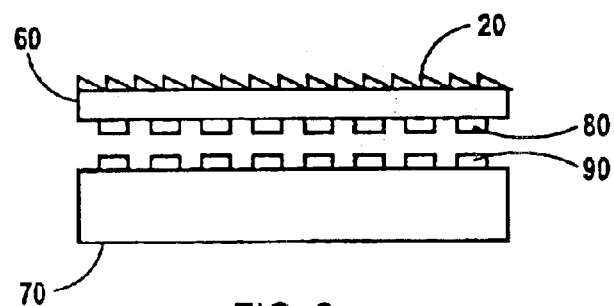
FIG. 2 is a schematic side elevation cross-sectional view of a first embodiment of an actuator made in accordance with the invention.

An actuator 50 provides for motion of aperture 30 relative to grating 20 (or, in principle, vice versa). Actuator 50 may be a linear actuator which moves aperture 30 by translation in a plane parallel with the plane of grating 20 and substrate 25. Thus, actuator 50 provides in-plane motion. FIG. 2 is a schematic side elevation cross-sectional view of a first embodiment of such a linear actuator 50. The actuator embodiment shown in FIG. 2 is an electrostatic actuator such as a conventional comb-drive actuator. Actuator 50 may be formed of polysilicon by conventional micromachining. Its upper movable element 60 is attached to aperture 30; its base 70 is fixed to substrate 25. Electrostatic comb-drive elements 80 and 90 are connected to suitable electrical signals with suitable timing in a conventional manner for electrostatic linear drives. Movable element 60 may be integral with plate 40. Thus, aperture 30 may be formed in movable element 60 of actuator 50 instead of being formed in a distinct plate 40, in which case plate 40 is the same as movable element 60 and base 70 may be the same as substrate 25. In such an embodiment, electrostatic comb-drive elements 90 are formed on substrate 25, and electrostatic comb-drive elements 80 are formed on plate 40. The top surface of actuator 50 is coated with aluminum or other high reflective material.

As shown in FIG. 1A, actuator 50 may consist of multiple segments arranged to move aperture 30 in various directions in its plane. The motions of actuator 50 can be discrete distances adapted to position aperture 30 appropriately to discrete positions aligned over each blazed portion 100, 110, 120, and 130. Or any desired color combination within a predetermined palette can be selected by suitable positioning of aperture 30 over the set of blazed portions 100, 110, 120, and black area 130. Thus, aperture 30 is moved in two in-plane dimensions parallel to the grating 20 with its set of grating portions by a MEMS linear step actuator responding to electronic signals.

Aperture 30 is positioned selectively by actuator 50 so that incident light 15 is diffracted by a selected one of the blazed grating portions 100, 110, or 120 and diffracted back through aperture 30 into a desired output direction (or absorbed by black area 130 if that is selected). As the selected grating portion is positioned relative to aperture 30, light of the corresponding wavelength or color is selected for the output. Collection or projection optics (not shown) may be provided in the output direction. No off-clip color synchronization is required.

Figure 3:
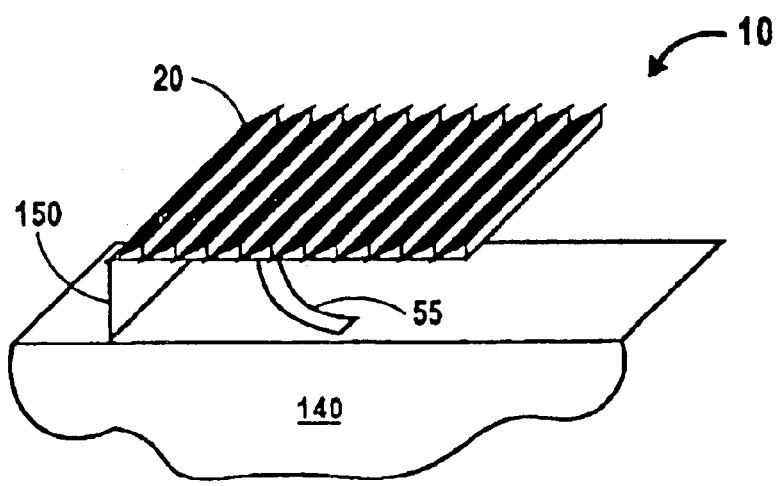
FIG. 3 is a schematic perspective view of a second embodiment of a color modulator made in accordance with the invention.
Figure 4:
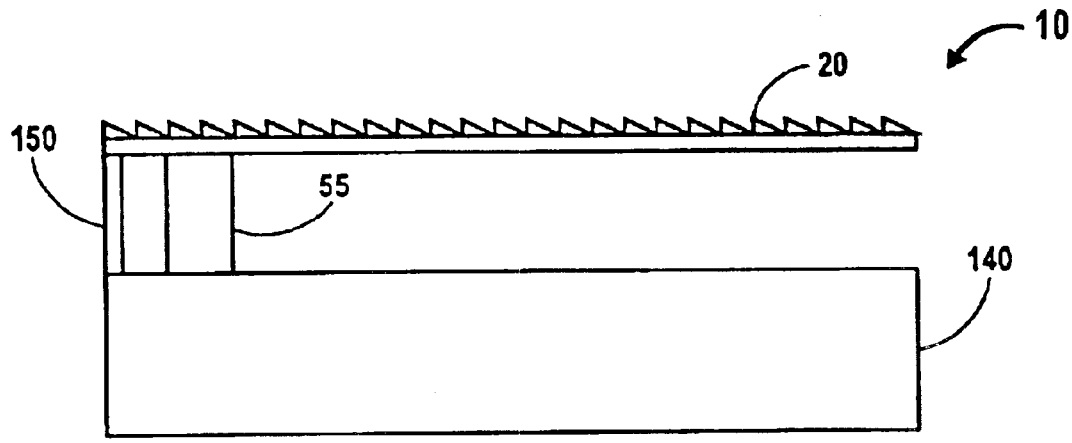
FIG. 4 is a schematic side elevation cross-sectional view of the second embodiment shown in FIG. 3.

FIG. 3 is a schematic perspective view of a second embodiment of a color modulator made in accordance with the invention. FIG. 4 is a schematic side elevation cross-sectional view of the second embodiment shown in FIG. 3. This embodiment has a blazed grating 20 anchored to substrate 140 at one end and tilted out-of-plane in either a continuous or discrete manner. Anchor element 150 provides support and anchoring for one end of grating 20. Grating 20 is tilted about an axis parallel to its plane, and in particular, about an axis parallel to its grooves. The tilting of grating 20 is achieved using a thermally actuated lift arm 55 responsive to an electrical signal. Again, while light 15 (not shown in FIG. 3) is diffracted selectively into a desired output direction toward collection or projection optics. Depending on the application, the grating is tilted either through a set of predetermined discrete angles (e.g., three discrete angles for an RGB display) or continuously through a range of angles. Modulator 10 modulates the color of each pixel by tilting grating 20 to a particular angle to select any color in the white light spectrum by precise control of the tit angle. In the discrete mode, three discrete tilt-angle values are predefined to select the red, green, and blue of an RGB color palette.

Resistive materials such as polysilicon, TaAl, TiW, or WSlN may be used for heating thermally actuated lift arm 55. Power-control circuit technology known in the art of thermal-ink-jet printing may be employed for control of thermally actuated lift arm 55. In comparison with the embodiment of FIGS. 1A and 1B, the embodiment of FIG. 3 is suitable for application in systems where larger deflection and lower operating frequency are required. One grating is used per pixel for all colors. Again, no off-chip color synchronization is required.

Figure 5:
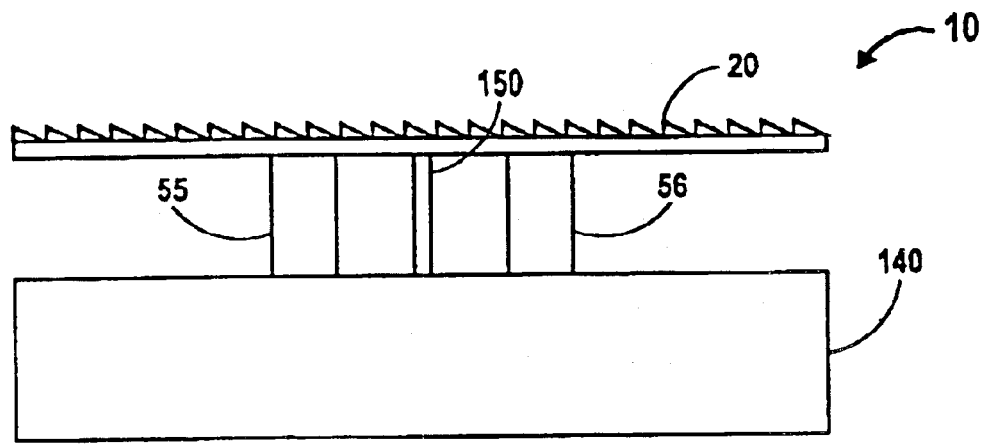
FIG. 5 is a schematic side elevation cross-sectional view of a third embodiment of a color modulator made in accordance with the invention.

FIG. 5 is a schematic side elevation cross-sectional view of a third embodiment of a color modulator with a configuration having two thermally actuated lift arms per grating plate. The two thermally actuated lift arms 55 are arranged on opposite sides of a central pivot or anchor element 150. The two actuators may be used differentially. i.e., one extending while the other contracts.

Figure 6:
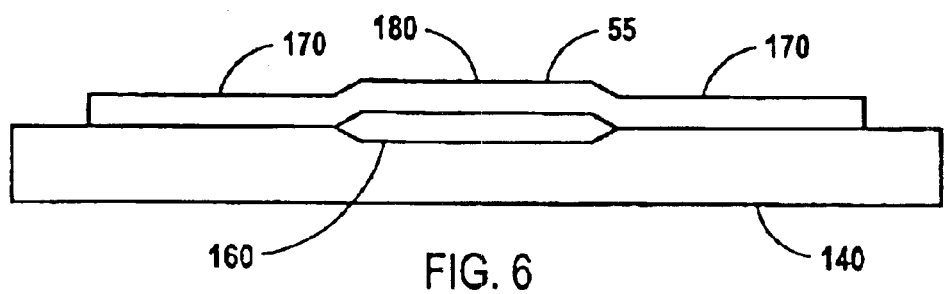
FIG. 6 is a schematic side elevation cross-sectional view of a second embodiment of an actuator made in accordance with the invention.

FIG. 6 is a schematic side elevation cross-sectional view of a second embodiment of an actuator made in accordance with the invention. The actuator shown in FIG. 6 is a pre-shaped monomorphic thermal actuator 180, which may be used as the actuator in embodiments such as those of FIGS. 3–5. To form the thermal actuator 55 of FIG. 6, a region of silicon oxide 160 is formed on a silicon substrate 140. The process of forming oxide region 160 is the known field-oxide process of conventional CMOS integrated-circuit fabrication. A layer of polysilicon or other suitable resistive material 170 is deposited and patterned. Although FIG. 6 shows the oxide still in place, oxide 160 is removed by etching to leave the pro-shaped monomorphic actuator 55. The monomorph thermal expansion beam thermal actuator 55 of FIG. 6 is pro-shaped in order to provide the proper desired initial deformation.

Figure 7:
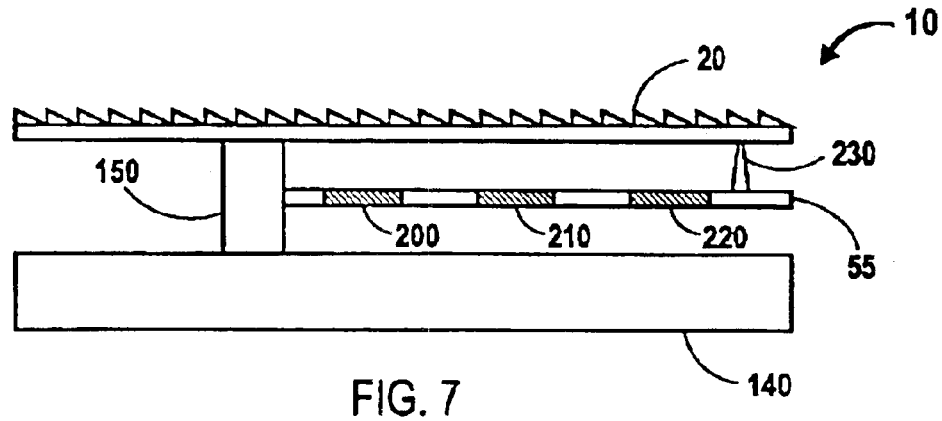
FIG. 7 is a schematic side elevation cross-sectional view of a fourth embodiment of a color modulator, with a third embodiment of an actuator made in accordance with the invention.

FIG. 7 is a schematic side elevation cross-sectional view of a fourth embodiment of a color modulator, including a third embodiment of an actuator made in accordance with the invention. The actuator 55 of FIG. 7 is a multi-segment thermal lift arm. A three-segment organic thermal actuator, as shown in FIG. 7, consists of three heater material layers 200, 210 and 220, each sandwiched between two polyimides with different thermal expansion coefficients.

Figure 8:
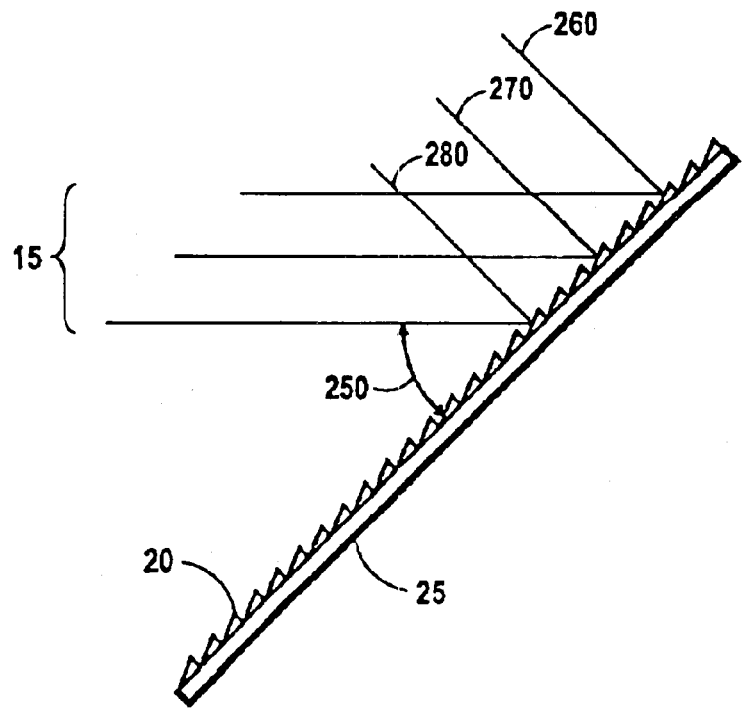
FIG. 8 is a schematic side elevation cross-sectional view illustrating angles for three wavelengths of light in a color modulator made in accordance with the invention.

FIG. 8 is a schematic side elevation cross-sectional view illustrating angles for three wavelengths of light in a color modulator made in accordance with the invention. FIG. 8 shows diffracted light rays 260, 270 and 280 from a blazed reflection grating 20 having a grating pitch of 1.608 microns and a uniform blaze angle of 20 degrees. The incident white light 15 enters from the left horizontally and is incident at an angle 250 to the plane of grating 20. Light is detracted off the grating and back outward toward the upper left where diffracted light rays 260, 270, and 280 are incident upon output optics (not shown). Table I shows the angular deviation from a direction normal to the plane of grating 20 for the three colors indicated. These small angular deviations can be compensated optically to nullify the change in angle with wavelength in the complete optical projection system.

TABLE I

Angular deviations for FIG. 8

| Ray | Wavelength | Angle of deviation |
| --- | --- | --- |
| 260 | 486 nm | −2.28 degrees |
| 270 | 550 nm | 0.001 degrees |
| 280 | 636 nm | 3.07 degrees |

Thermal actuators generally provide greater force and deflection than equivalently sized electrostatic or plezo-based actuators, although they operate in higher power consumption and lower frequency. These devices utilize thermal expansion to provide in-plane and out-of-plane motions. Both monomorph and bimorph structures have been demonstrated. In order to provide the desired positioning uniformity of better than 1%, the energy applied is tightly controlled and the ambient environment of the thermal actuators may be controlled, e.g., by using an inert-gas-filled package using a gas such as nitrogen.

Thus, one aspect of the invention is embodied in a light modulator for modulating light from a source, the light modulator including at least one grating disposed to be illuminated by the light from the source and a MEMS actuator adapted for moving the grating or gratings. The grating or gratings are adapted is to be movable (either continuously or among a set of discrete positions) by the MEMS actuator to a selected position, to direct light of a selected wavelength diffracted by the grating into a selected direction. The grating may be blazed to diffract the selected wavelength into a selected diffraction order. The grating may be adapted to be movable in translation along an axis parallel to the plane of the grating, or to be tilted about an axis parallel to the plane of the grating. Instead of (or in addition to) moving the grating in translation relative to an aperture, the aperture may be adapted to be moved relative to the grating and that motion may be a translation. The bit axis, if any, may be parallel to the grooves of the grating. The MEMS actuator may be adapted for tilting the blazed grating to three or more predetermined discrete angles to selectively direct light of three or more predetermined wavelengths diffracted by the blazed grating into a selected direction (e.g., three wavelengths corresponding to red, green, and blue of an RGB palette).

A spatial light modulator may be made by fabricating a number of individual modulators together, e.g., by arranging the individual modulators in an array. Another aspect of the invention is a method for fabricating a light modulator for modulating light from a source. The overall method includes steps of providing a substrate, forming at least one diffraction grating on the substrate by forming a number of parallel grooves spaced with a suitable pitch, while blazing the parallel grooves to diffract light of a selected diffraction order, and forming a MEMS actuator disposed and adapted for establishing a desired spatial relationship between the diffraction grating and an output aperture (spaced apart from the substrate) to selectively direct light of at least one selected wavelength though the output aperture.

Thus, in use of the invention, a method is employed for modulating the dolor of light from a source. The method includes (a) disposing a blazed grating to be illuminated by the light to be modulated and to diffract that light, (b) disposing a MEMS actuator for varying the spatial relationship between the blazed grating and an output aperture (the MEMS actuator being adapted to vary the spatial relationship in response to electrical signals), and (c) controlling the electrical signals to the MEMS actuator to direct a selected wavelength of the diffracted light of a selected diffracted order to the output aperture. In this method, the MEMS actuator may be adapted to tilt the blazed grating about an axis parallel to the grating, to translate the output aperture in a plane that is substantially parallel to the blazed grating, or to translate the blazed grating in a plane that is substantially parallel to the output aperture.

INDUSTRIAL APPLICABILITY

The invention provides a color modulator useful in many technical applications, including a source of light of a desired color or a display of information in color for use with information-processing equipment, for example.

Although the foregoing has been a description and illustration of specific embodiments of the invention, various modifications and changes thereto can be made by persons skilled in the art without departing from the scope and spirit of the invention as defined by the following claims. For example, various embodiments may be combined such that gratings may be moved both by translation and/or rotation in a plane and by tilting out of the plane, and other types of actuators such as piezo-based actuators, may be employed.

What is claimed is:

1. A light modulator for modulating light from a source, said light modulator comprising:
   at least one grating disposed to be illuminated by said light from said source,
   said at least one grating being adapted to be movable among a set of discrete positions, and
   a MEMS actuator adapted for moving said at least one grating to a selected position among said set of discrete positions, to direct light of a selected wavelength diffracted by said grating into a selected direction.

2. A spatial light modulator comprising a multiplicity of light modulators according to claim 1.

3. A light source comprising at least one light modulator according to claim 1.

4. A display device comprising a multiplicity of light modulators according to claim 1, arranged in an array.

5. The light modulator of claim 1, wherein said at least one grating comprises at least one grating having a multiplicity of parallel grooves, said grating being adapted to be tilted about an axis parallel to said grooves.

6. The light modulator of claim 5, wherein said at least one grating is adapted to be tilted to a selected angle among a set of discrete angles relative to said light from said source.

7. The light modulator of claim 5, wherein said at least one grating comprises a multiplicity of gratings.

8. A spatial light modulator according to claim 7, wherein said multiplicity of gratings is arranged in an array.

9. The light modulator of claim 1, wherein said at least one grating comprises at least one grating having a multiplicity of parallel grooves, said grating being blazed to diffract said selected wavelength into a selected diffraction order.

10. A spatial light modulator comprising a multiplicity of light modulators according to claim 9, arranged in an array.

11. The light modulator of claim 1, wherein said at least one grating comprises at least one grating having a multiplicity of parallel grooves in a plane, said grating being adapted to be movable substantially parallel to said plane.

12. The light modulator of claim 11, wherein said grating is adapted to be movable by translation along an axis substantially parallel to said plane.

13. The light modulator of claim 11, wherein said at least one grating comprises at least one grating having a multiplicity of parallel grooves, said grating being blazed to diffract said selected wavelength into a selected diffraction order.

14. The light modulator of claim 13, comprising three or more blazed gratings, each blazed for a different wavelength.

15. The light modulator of claim 14, wherein said three or more blazed gratings, are blazed for wavelengths corresponding to red, green, and blue light.

16. A spatial light modulator comprising a multiplicity of light modulators according to claim 13, arranged in an array.

17. A light modulator for modulating light from a source, said light modulator comprising:
    a blazed grating disposed to be illuminated by said light from said source, and
    a MEMS thermal actuator adapted for tilting said grating continuously through a range of angles relative to said light from said source, to direct light of a selected wavelength diffracted by said grating into a selected direction.

18. The light modulator of claim 17, wherein the MEMS thermal actuator is adapted for tilting the blazed grating to three or more predetermined discrete angles to selectively direct light of three or more predetermined wavelengths diffracted by the blazed grating into a selected direction.

19. The light modulator of claim 17, wherein the blazed grating is adapted to be tilted about an axis and wherein the MEMS thermal actuator comprises two thermal actuating elements disposed on opposite sides of said axis, each of the two thermal actuating elements being adapted for tilting the blazed grating about said axis.

20. The light modulator of claim 17, wherein the MEMS thermal actuator comprises a pre-shaped monomorphic thermal actuator.

21. The light modulator of claim 20, wherein the MEMS thermal actuator is formed by the steps of: forming silicon oxide on a region of a silicon substrate, covering the silicon oxide with a layer of polysilicon, and removing the silicon oxide.

22. The light modulator of claim 17, wherein the MEMS thermal actuator comprises a cantilevered thermal lift arm.

23. The light modulator of claim 22, wherein the cantilevered thermal lift arm comprises a plurality of segments, each segment thereof comprising a heater material and two materials having unequal thermal expansion coefficients.

24. A spatial light modulator comprising a multiplicity of light modulators according to claim 17, arranged in an array.

25. A display device comprising a multiplicity of light modulators according to claim 17, arranged in an array.

26. A light modulator for modulating light from a source, said light modulator comprising:
    at least one means for diffracting said light from said source, said at least one means for diffracting being disposed to be illuminated by said light from said source and being adapted to be movable among a set of positions, and
    microelectromechanical means for actuating, adapted for moving said at least one means for diffracting to a selected position, to direct light of a selected wavelength into a selected direction.

* * * * *